United States Patent Office 3,424,267
Patented Jan. 28, 1969

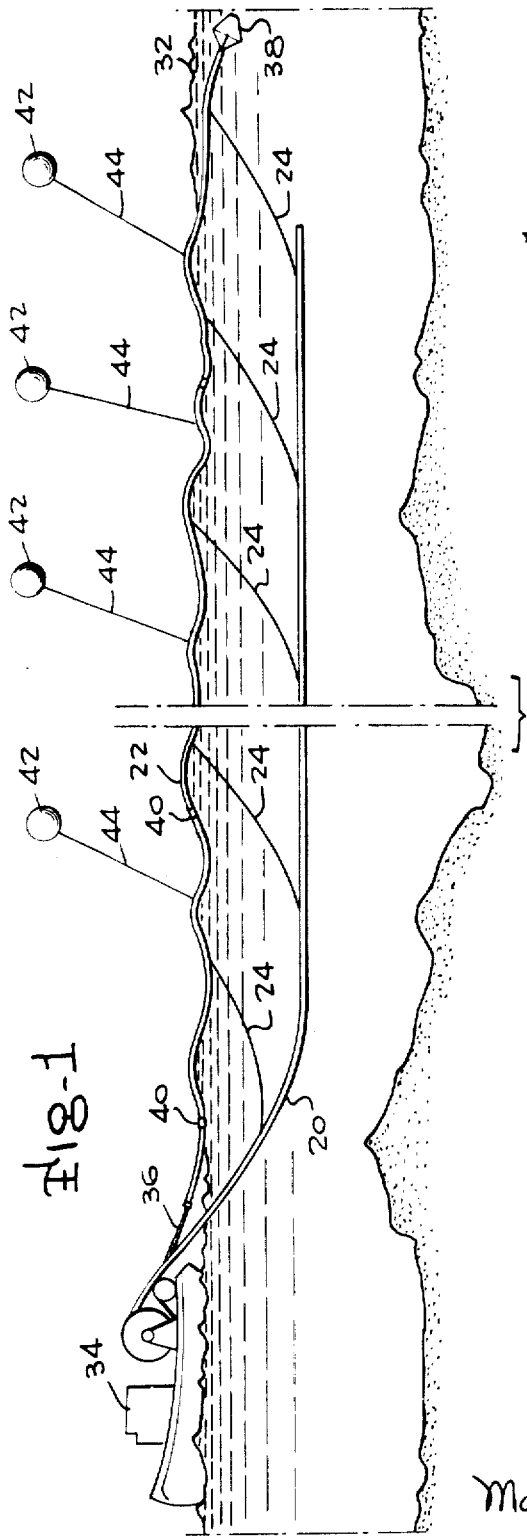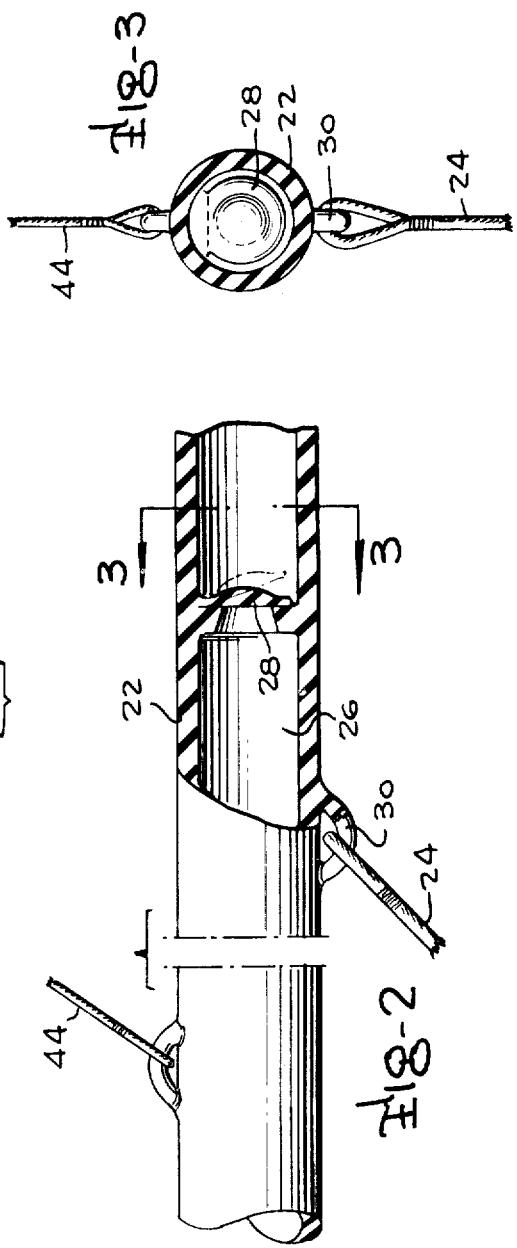
Jan. 28, 1969 — J. J. BABB — 3,424,267
MARINE SEISMIC CABLE SUPPORT SYSTEM
Filed May 29, 1967
INVENTOR
JOHN J. BABB
BY Mason, Fenwick & Lawrence
ATTORNEYS

3,424,267
MARINE SEISMIC CABLE SUPPORT SYSTEM
John J. Babb, Jackson, Miss., assignor to Delta Exploration Company, Inc., Jackson, Miss., a corporation of Mississippi
Filed May 29, 1967, Ser. No. 641,943
U.S. Cl. 181—.5
Int. Cl. G10k 11/12
10 Claims

ABSTRACT OF THE DISCLOSURE

A seismic cable supported from an inflated hose by elastic lines oriented at an acute angle with respect to the hose and the line to provide a minimum of disturbance of the seismic cable due to surface disturbances.

Background of the invention

This invention relates generally to the field of seismic surveys, and more particularly, to the field of seismic surveys of water-covered areas.

The seismic art has employed many types of acoustic energy sources for creating pressure waves which enter the earth and are reflected from sub-surface geological formations to be detected by various forms of surface detection and recording means. Explosive charges, gas guns, electric spark discharge devices and vibrators have all been employed for the purpose of providing pressure waves in seismic exploration. While the use of explosive charges generally provides a sufficiently powerful energy source to obtain an acceptable signal to noise ratio, the use of such explosive charges entails considerable risk and expense and has been curtailed by Government agencies and public pressure in many areas. Consequently, a great need has arisen for seismic cable systems which have less inherent noise than the previously employed systems so as to enable the use of low energy wave sources in place of explosives. By way of explanation, the movement of the cable through the water causes vibration waves which are similar in frequency to the geophysical or seismic signals which have been reflected back to the cable from an earth formation. The reflected waves or vibrations are generally referred to as "signals" whereas all other waves or vibrations are referred to as noise. While the signal to noise ratio has been generally poor with the previously employed geophysical cable systems, the energy output of the explosive means employed has been sufficient to overcome the noise and leave a sufficient energy level of the signal to provide an adequate readout signal.

However, the increased use of low energy pressure wave sources has created a great need for seismic cable systems having very low inherent noise. One form of previous system employed uses a series of buoys attached along and towed by a seismic cable. The buoys are large and heavy and rise and fall with the surface waves to exert force on the submerged cable. The vibrations and movement of the cable result in a high noise level.

It has also been attempted to eliminate vertical motion of the seismic cable by the provision of means for giving the cable a neutral buoyancy so that it will remain at a given level in the water. However, such attempts have not proven successful in that the density of the environmental water varies considerably from location to location for a variety of reasons. Consequently, such neutral buoyancy devices either float on the surface or sink below the desired level of operation. Either result can completely eliminate their usefulness.

Another disadvantage of the previously employed systems is that it is necessary to maintain boat speed to prevent the sinking and consequent snagging of the cable on the bottom of the sea. Since the noise level increases with speed of the boat cable, it is obviously desirable to provide a system that can be towed at very slow speeds and even stopped if necessary without the risk of the resultant contact with the bottom.

Yet another problem encountered with the previously employed submerged seismic cable systems is that the systems have not been readily visible to other vessels in the area. Since such systems may exceed a mile in length, this can create a hazardous problem as well as an expensive problem when the cable is severed by another vessel. It is therefore, desirable to provide a cable system employing means visible along its length to indicate its presence.

Summary of the invention

It is a primary object of this invention to provide a new and improved seismic cable system for marine use.

The object is achieved by the provision of an elongated hollow hose member floating on the water surface and having plural elastic lines attached at intervals along its length to support a negatively buoyant seismic cable at a desired depth beneath the water surface. The lines are oriented at an acute angle with respect to both the hose and the cable so that motion of the hose caused by surface waves is not transmitted to the seismic cable. Balloons are attached to the hose by light lines and are inflated with a buoyant gas to provide a visual indication above the surface of the sea indicative of the position of the seismic system.

Brief description of the drawings

FIGURE 1 is an elevational view illustrating the invention system in use in a body of water;

FIGURE 2 is a side elevational view of the support hose of this invention with portions removed to illustrate the interior construction of the hose; and FIGURE 3 is a sectional view of the invention taken along lines 3—3 of FIGURE 2.

Description of the preferred embodiment

The system of the preferred embodiment of the invention is best illustrated in its entirety in FIGURE 1 and consists of a conventional seismic cable 20 supported by an elongated buoyant tubular support member in the form of a hollow hose 22. The seismic cable 20 is supported by support member 22 by means of a plurality of lightweight elastic lines 24 connected between the two members and spaced at intervals along their length.

The seismic cable 20 is of conventional design per se and is manufactured by the Vector Cable Company, Houston, Tex. Other cables such as the cable illustrated in U.S. Patent No. 2,772,405 can be employed if desired. The density of the cable must, however, be adjusted to be slightly greater than the high density of the water in which the cable is to be deployed. The supporting hose 22 is formed of rubber or other suitable elastomeric material and has a hollow interior 26 as shown in FIGURE 2. The interior 22 is inflated with air to give the hose a slight positive buoyancy and a number of check valves 28 are located along the length of the hose in order to prevent its sinking in case of accidential cutting. The check valves are generally located approximately 100 feet apart. The elastic lines 24 are attached to the support member 22 by means of ears 30 or by any other conventional means located at approximately 200 feet apart along the length of the support member. Lines 24 are of such a length as to enable the operation of the seismic cable 20 in a depth range of 30 to 40 feet below the surface of the body of water 32 in which the cable is deployed.

The forward end of support member 22 is connected to a towing vessel 34 by an elastic towline 36, and the seismic cable 20 is connected to vessel 34 in a direct manner as illustrated in FIGURE 1. A sea anchor or other suitable drag means 38 is attached to the extreme end of support member 22. The support member 22 is conveniently formed of discreet portions connected by suitable connector means 40 as shown in FIGURE 1. A wide variety of conventional connectors for hose elements can be employed for this purpose.

In operation, the system is deployed behind vessel 34 for towing through the body of water 32. The depth of seismic cable 22 can be adjusted by adding additionl sections to the support member 22 so as to cause the angle of the resilient lines to the cable to become more acute and thereby cause the seismic cable to assume a shallower depth. On the other hand, shortening of the support member 22 causes the seismic cable 20 to operate at a greater depth.

One very great advantage of the system illustrated in FIGURE 1 is that it can be deployed in narrow inlets and other restricted areas which have been inaccessible to the previously employed cable systems. This is true because the conventional cable systems currently in use require about five miles of straight towing in order to get the cable into proper position for use. Restricted inlets and the like do not permit such straight line towing for such a distance. On the other hand, the cable of the instant invention can be deployed by anchoring vessel 34 and having another boat pull out the whole system by tieing to the end of the support member 22. During this operation, the seismic cable remains quite shallow and can be taken almost ashore. The system is then ready for towing use almost immediately upon the making of headway by the towing vessel.

It is desirable to isolate the seismic cable 20 from all unnecessary movement causing force as noted previously. The system of this invention achieves such isolation in a manner far superior to any of the previously employed devices. This result is due to the combinational effect of the elements employed. For example, the support member 22 has only a slight positive buoyancy so that wave action at the surface of the body of water does not cause any large amount of tugging force to be applied to the elastic lines 24. Also, the connection of support member 22 to the vessel 34 by elastic towline 36 serves to dampen any vibrations from vessel 34 to the support member 22. Similarly, the support member 22 and seismic cable 20 are normally adjusted so that the elastic lines 24 are oriented at an acute angle with respect to both elements as shown in FIGURE 1 and vertical movement of support member 22 will primarily result in a turning or rotative movement of line 24 rather than a vertical lifting movement as would be the case if the lines were oriented vertically. The fact that lines 24 are elastic is also of great help in damping vibrations.

It should be understood that the system illustrated in FIGURE 1 can be up to 10,000 feet in length and is consequently quite susceptible to being cut by other vessels. In order to prevent such occurrences, a series of balloons 42 are attached along the length of member 22 by lightweight lines 44 as shown. Light flashers can be attached to the balloons for nocturnal operation. Consequently, other vessels in the area are aware of the presence of the towed system and can avoid colliding with such.

The system is easily reloaded upon vessel 34 when an operation is completed. The reloading is achieved by paying out an additional length of member 22 so as to reduce the distance between member 22 and the seismic cable 20. Then both the floating member 22 and the support cable 20 are wound on a reel with the resilient lines remaining intact.

Therefore, it will be obvious that the invention provides a new and improved system that gives positive depth and position control of the seismic cable in a simple and efficient manner. It also provides a surface indication of the position of the seismic system so that other boats and ships are aware of its presence. Probably the greatest advantage of the instant system is that it maintains the seismic cable in a true horizontal position with a minimum up and down movement and vibration so as to generate very little noise in the sensitive cable. Furthermore, the floating member 22 does not contribute any noise to the cable 20 since it is not towed by the cable as are the conventionally employed buoys and finned devices. The elastic line connection oriented at an acute angle between the members practically isolates the seismic cable from disturbances of the supporting member.

I claim:

1. An improved system for conducting an underwater survey from a moving vessel, said system comprising:
   an elongated flexible buoyant tubular support member extending along and floating upon the surface of the water and connected at a forward end to the vessel;
   a seismic detector cable towed by the vessel and having slight negative buoyance; and
   spaced support lines extending between said elongated tubular support member and said seismic detector cable to provide a support for said seismic cable to maintain said seismic cable at a generally uniform depth along its length.

2. The system recited in claim 1 wherein said elongated flexible buoyant tubular support member is generally a hollow hose member.

3. The system recited in claim 2 wherein said support lines are oriented at an acute angle with respect to said seismic detector cable and said hollow inflatable hose.

4. The system of claim 3 wherein the connection of each of said lines to said hose is spaced farther from said vessel than is the connection of each of said lines to said seismic cable.

5. The system of claim 4 additionally including a drag means on the free end of said hose.

6. The system of claim 1 wherein said support lines are elastic and are oriented at a generally acute angle with respect to said enlongated flexible buoyant support member and said cable.

7. The system of claim 6 wherein said elongated buoyant tubular support member is a generally hollow hose member having a small positive buoyancy.

8. The system of claim 7 wherein the connection of each of said lines to said hose is spaced farther from said vessel than is the connection of each of said lines to said seismic cable.

9. The system of claim 8 additionally including a drag means on the free end of said hose.

10. The system of claim 9 additionally including check valve means located along the length of said hose and marker balloons attached along the length of said hose to provide a visual indication of the position of said system.

References Cited

UNITED STATES PATENTS

| 2,607,842 | 8/1952 | Reid | 181—5 |
| 3,359,536 | 12/1967 | Coburn | 340—7 |

SAMUEL FEINBERG, Primary Examiner.

U.S. Cl. X.R.

340—7